United States Patent
Hamann et al.

(10) Patent No.: US 10,875,523 B2
(45) Date of Patent: Dec. 29, 2020

(54) METHOD FOR OPERATING A HYBRID DRIVE TRAIN OF A MOTOR VEHICLE AND MOTOR VEHICLE

(71) Applicant: VOLKSWAGEN AKTIENGESELLSCHAFT, Wolfsburg (DE)

(72) Inventors: Harry Hamann, Mannheim (DE); Johannes Grünewald, Bad Harzburg (DE); Rainer Wrede, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 243 days.

(21) Appl. No.: 16/201,324

(22) Filed: Nov. 27, 2018

(65) Prior Publication Data

US 2019/0161071 A1 May 30, 2019

(30) Foreign Application Priority Data

Nov. 30, 2017 (DE) .................. 10 2017 221 495

(51) Int. Cl.
*B60W 20/20* (2016.01)
*B60W 10/02* (2006.01)
(Continued)

(52) U.S. Cl.
CPC ............ *B60W 20/20* (2013.01); *B60W 10/02* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| 2012/0198962 A1* | 8/2012 | Houle ................. B60K 6/448 74/661 |
| 2015/0298546 A1 | 10/2015 | Maruyama et al. |
| 2018/0201116 A1* | 7/2018 | Miyagawa ........ B60W 50/0097 |

FOREIGN PATENT DOCUMENTS

| DE | 699 22 221 T2 | 3/2006 |
| DE | 10 2011 112 643 A1 | 3/2013 |

(Continued)

OTHER PUBLICATIONS

Search report for German Patent Application No. 10 2017 221 495.3, dated Jul. 30, 2018.

*Primary Examiner* — Abdhesh K Jha
(74) *Attorney, Agent, or Firm* — Pearl Cohen Zedek Latzer Baratz LLP (57) ABSTRACT

A method for operating a hybrid drive train of a motor vehicle, comprises the following steps: closing the separating clutch in order to mechanically couple the internal combustion engine to at least one wheel and to propel the motor vehicle, whereby the drive power is supplied at least partially by the internal combustion engine; determining the TARGET drive power (P) of the drive train of the motor vehicle; determining the ACTUAL speed (V) of the motor vehicle; determining the switchover power (U) to separate the separating clutch and to operate the drive train in the serial mode of operation (SB) as a function of the determined ACTUAL speed (V); and issuing a warning message when the difference between the switchover power (U) and the TARGET drive power (P) falls below a prescribed drive power tolerance value (T). Furthermore, the invention relates to a motor vehicle.

16 Claims, 4 Drawing Sheets

(51) Int. Cl.
    *B60W 10/06*     (2006.01)
    *B60W 10/08*     (2006.01)
    *B60W 20/10*     (2016.01)
    *B60W 50/14*     (2020.01)
    *B60K 6/442*     (2007.10)
    *B60W 50/16*     (2020.01)

(52) U.S. Cl.
    CPC ............ *B60W 20/10* (2013.01); *B60W 50/16* (2013.01); *B60K 6/442* (2013.01); *B60W 2050/146* (2013.01); *B60W 2520/10* (2013.01); *B60W 2540/10* (2013.01); *B60W 2710/021* (2013.01); *B60Y 2200/92* (2013.01)

(56) References Cited

FOREIGN PATENT DOCUMENTS

DE     11 2012 007 156 T5     8/2015
EP     2 070 787 B1     12/2010
WO     WO 00/15455 A2     3/2000

\* cited by examiner

METHOD FOR OPERATING A HYBRID DRIVE TRAIN OF A MOTOR VEHICLE AND MOTOR VEHICLE

CROSS-REFERENCE TO RELATED APPLICATIONS

This application claims priority from German Patent Application No. 10 2017 221 495.3, filed Nov. 30, 2017, which is hereby incorporated by reference.

FIELD OF THE INVENTION

The present invention relates to a method for operating a hybrid drive train of a motor vehicle. Moreover, the invention relates to a motor vehicle with such a hybrid drive train, said motor vehicle being suitable for carrying out such a method.

BACKGROUND OF THE INVENTION

Motor vehicles with a hybrid drive train comprising at least a first electric machine, a second electric machine as well as an internal combustion engine can be operated in two different modes of operation when the internal combustion engine is running and when the drive train components are in a given mechanical arrangement.

A first operating mode is the serial mode of operation in which a drive torque is supplied exclusively by the second electric machine. The electric energy for operating the second electric machine is supplied by the internal combustion engine in conjunction with the first electric machine. For this purpose, the first electric machine is powered by the internal combustion engine in order to generate the electric energy in this manner. The serial mode of operation has the advantage that an operating point of the internal combustion engine—if the internal combustion engine and the first electric machine are correctly dimensioned—is freely selectable so that the internal combustion engine and the first electric machine can be operated with optimized efficiency. Within this scope, any excess electric energy that has been produced can be fed, for example, to a battery of the motor vehicle.

A second mode of operation is the parallel mode of operation in which the drive torque required to power the motor vehicle is supplied partially by the internal combustion engine and partially by the second electric machine. In the parallel mode of operation, two or more drive machines are mechanically coupled to the wheel. Optionally, it can be provided that the first electric machine likewise supplies part of the drive torque. This case is also referred to as "boosting". In the parallel mode of operation, it can likewise be provided that part of the torque supplied by the internal combustion engine is used to power the first electric machine so that the first electric machine generates electric energy for the second electric machine and/or for recharging the battery.

A special embodiment of a motor vehicle with a hybrid drive train has a first gear that mechanically couples the internal combustion engine to at least one wheel of the motor vehicle, whereby the first gear is configured as a non-shiftable gear with a prescribed gear ratio. Such a first gear is also referred to as a "direct gear stage". The first gear can be manually coupled to the internal combustion engine via a separating clutch. Normally, such a direct gear stage is configured for maximum system efficiency so that, in order to additionally couple in the internal combustion engine, the separating clutch can only be closed above a minimum speed of about 55 km/h.

At speeds above the minimum speed, in other words, above about 55 km/h, as well as when the separating clutch is closed or when the internal combustion engine has been additionally coupled in, it can happen that a TARGET torque is selected which, at the momentary ACTUAL vehicle speed, cannot be achieved in the parallel mode of operation. Particularly at vehicle speeds slightly above the minimum speed, the maximum achievable drive torque of the internal combustion engine is very limited because of the low rotational speed entailed by the direct gear stage. In such a case, the parallel mode of operation has to be changed to the serial mode of operation. Particularly at very high torque demands, such a change in the modes of operation especially causes "howling" of the internal combustion engine and/or a change to the serial mode which might be less favorable in terms of energy, since the internal combustion engine has to be operated at a high rotational speed for purposes of the generative operation of the first electric machine in order to ensure that sufficient electric energy is generated. Such "howling" of the internal combustion engine during the serial mode of operation has a particularly negative effect on the driving comfort and on the power-specific noise emission of the drive train. Within the scope of the invention, the term "power-specific noise emission" refers to the relationship between the drive power and the emission of noise by the drive train, whereby an increasing noise emission of the drive train is at least associated with an increasing drive power.

German patent application DE 10 2011 112 643 A1 discloses a hybrid vehicle with a display device having several display means to display a prescribed load demand, to display the maximum achievable load demand in a momentary mode of operation as well as to display the maximum achievable load demand in an alternative mode of operation. European patent specification EP 2 070 787 B1 discloses a hybrid vehicle having a display device that is configured to display a load demand by the driver as well as a transition from the electric mode of operation to a hybrid mode of operation. Such display devices have the drawback that transitions from the parallel mode of operation to the serial mode of operation are not evident to the driver.

SUMMARY OF THE INVENTION

Before this backdrop, it is the objective of the present invention to eliminate or at least partially eliminate the drawbacks described above when it comes to a method for operating a hybrid drive train of a motor vehicle as well as to a motor vehicle having a hybrid drive train. In particular, it is the objective of the present invention to create a method for operating a hybrid drive train of a motor vehicle as well as a motor vehicle having a hybrid drive train that can easily and inexpensively improve the dynamic driving operation of the motor vehicle as well as the power-specific noise emission of the drive train.

The above-mentioned objective is achieved by the patent claims. Accordingly, the objective is achieved by a method for operating a hybrid drive train of a motor vehicle having the features of the independent claim 1 as well as by a motor vehicle with a hybrid drive train having the features of the alternative independent claim 8. Further features and details of the invention ensue from the subordinate claims, from the description and from the drawings. Of course, features and details that are described in conjunction with the method according to the invention also apply in conjunction with the motor vehicle according to the invention and vice versa, so that, as far as the disclosure is concerned, reciprocal reference is always made or can be made to the individual aspects of the invention.

According to a first aspect of the invention, the objective is achieved by a method for operating a hybrid drive train of a motor vehicle. The hybrid drive train has an internal combustion engine, a first electric machine and a second electric machine, whereby the first electric machine is mechanically coupled to the internal combustion engine, whereby the internal combustion engine is mechanically coupled via a separating clutch of the hybrid drive train to a first gear of the hybrid drive train, whereby the first gear is mechanically coupled to at least one wheel of the motor vehicle, and whereby the second electric machine is mechanically coupled to at least one wheel of the motor vehicle. The method comprises the following method steps:
- closing the separating clutch in order to mechanically couple the internal combustion engine to the at least one wheel and to propel the motor vehicle, whereby the drive power is supplied at least partially by the internal combustion engine,
- determining the TARGET drive power of the drive train of the motor vehicle,
- determining the ACTUAL speed of the motor vehicle,
- determining the switchover power to separate the separating clutch and to operate the drive train in the serial mode of operation as a function of the determined ACTUAL speed, whereby the drive power is supplied in the serial mode of operation by the second electric machine, whereby the electric energy for operating the second electric machine is generated at least partially by the first electric machine, whereby the first electric machine is powered by the internal combustion engine in order to generate the electric energy, and
- issuing a warning message when the difference between the switchover power and the TARGET drive power falls below a prescribed drive power tolerance value.

The hybrid drive train preferably has a second gear, especially a single-stage gear or a non-shiftable gear, via which the second electric machine is mechanically coupled to the at least one wheel of the motor vehicle. Moreover, the hybrid drive train preferably has a third gear, especially a single-stage gear or a non-shiftable gear, via which the first electric machine is mechanically coupled to the internal combustion engine. According to the invention, it can be provided for the hybrid drive train to have a differential gear.

The method according to the invention for operating a hybrid drive train of a motor vehicle is carried out while the motor vehicle is being driven, especially above a minimum speed. The minimum speed results from a gear ratio of the first gear and from characteristic values of the internal combustion engine such as, for example, the idling speed of the internal combustion engine. Above the minimum speed, it can be achieved that at least part of the drive power is supplied by the internal combustion engine. Preferably, the internal combustion engine and the first gear are configured in such a way that the minimum speed is about 55 km/h. Closing the separating clutch mechanically couples the internal combustion engine to the at least one wheel of the motor vehicle so that at least part of the drive power of the motor vehicle is supplied by the internal combustion engine. It can be provided that, at this point in time, all of the drive power of the hybrid drive train is supplied by the internal combustion engine.

Within the scope of the invention, the TARGET drive power can also be replaced by a TARGET torque, whereby in this case, the switchover power has to be replaced by the switchover torque and the drive power tolerance value has to be replaced by the drive torque tolerance value. The TARGET drive power is preferably determined continuously or at least essentially continuously. Essentially continuously means, for example, intermittently at regular or irregular time intervals.

The ACTUAL speed of the motor vehicle is preferably determined by means of at least one wheel speed sensor of the motor vehicle and optionally by means of additional sensor signals as well as by means of signals estimated by algorithms. The ACTUAL speed is preferably determined continuously or at least essentially continuously.

In order to determine the switchover power for separating the separating clutch, preferably a set of characteristic curves of the hybrid drive train is used, whereby the switchover power is dependent on the speed of the motor vehicle. Additional dependencies such as, for example, the temperatures of drive train components, the driving resistances, the load states of the battery or the like can optionally be taken into account. By the same token, a selected driving profile such as, for example, the ECO or Sport driving mode, can be taken into account in determining the switchover power. Preferably, the switchover power depends on the speed of the motor vehicle in such a way that, as the speed increases, the switchover power likewise increases. The ratio between the speed and the switchover power can be linear or at least linear in certain segments. By means of such a set of characteristic curves, a concrete value of the switchover power is associated with each determined ACTUAL speed. The switchover power is preferably determined continuously or at least essentially continuously.

The difference between the switchover power and the TARGET drive power is determined on the basis of the determined switchover power. The difference is preferably determined continuously or at least essentially continuously. This difference is compared to a prescribed drive power tolerance value. This comparison is preferably made continuously or at least essentially continuously. If this difference has a lower value than the prescribed drive power tolerance value, a warning message is issued according to the invention. The drive power tolerance value is preferably between 1% and 15% of the switchover power, preferably between 3% and 10% of the switchover power, and especially preferably approximately 8% of the switchover power.

Within the scope of the invention, the term "warning message" refers to a message that is issued as a function of an event and that thus differs from mere displaying operating parameters. Preferably, the warning message is issued as an intermittent signal so that it can be clearly distinguished from a conventional display. The warning message is preferably issued until the difference once again has a greater value than the drive power tolerance value or until the motor vehicle is being operated in the serial mode of operation. Preferably, the warning message can be issued as a function of the magnitude of the difference so that the intensity and/or frequency of the warning message increases as the difference decreases.

A method according to the invention for operating a hybrid drive train of a motor vehicle has the advantage over conventional methods that, with simple means and in a cost-effective manner, the driver of the motor vehicle can be informed of an impending change to the serial mode of operation of the hybrid drive train, so that the driver is given the option to avoid or at least to delay such a change by actively reducing the TARGET drive power. In this manner, the driver of the motor vehicle can prevent or at least reduce "howling" of the internal combustion engine and/or a change to the serial mode which night be less favorable in terms of energy. These functionalities can increase the comfort and the system efficiency in comparison to conventional methods.

It is preferable according to the invention for the motor vehicle to be operated in a parallel mode of operation or in an electric mode of operation whenever the drive power tolerance value is exceeded, whereby in the parallel mode of operation, the drive power is supplied by the internal combustion engine and by the second electric machine, and whereby in the electric mode of operation, the drive power is supplied by the second electric machine. In the parallel mode of operation, the internal combustion engine is running and has an operating rotational speed. If the TARGET drive power exceeds the speed-dependent switchover power, the TARGET drive power cannot be supplied in the parallel mode of operation or in the electric mode of operation, so that a change to the serial mode of operation is necessary. The operation of the motor vehicle in the parallel mode of operation is characterized by a particularly high energy efficiency so that it is advantageous to remain in the parallel mode of operation as long as possible in order to extend the range of the motor vehicle. The electric mode of operation is characterized especially by a high driving comfort and low driving noises, so that it is advantageous to remain in the electric mode of operation as long as possible in order to retain the driving comfort in the motor vehicle. Owing to the issuing of the warning message, the driver of the motor vehicle is able to adapt the TARGET drive power in such a way that the switchover power is not exceeded and therefore, the motor vehicle continues to be operated in the parallel mode of operation or in the electric mode of operation.

It is also preferable for the TARGET drive power to be determined on the basis of a position of the gas pedal of the motor vehicle and/or by a speed control system of the motor vehicle. By actuating the gas pedal, the driver of the motor vehicle can transmit the acceleration command to the motor vehicle. The pedal position is in a functional relationship with the TARGET drive power, so that the TARGET drive power can be derived from the pedal position. If applicable, additional information such as, for example, the ACTUAL speed of the motor vehicle, the weight of the motor vehicle, an incline of the road or the like, can be used to determine the TARGET drive power. By the same token, by taking into account parameters that can be determined for the motor vehicle as well as for the incline of the road, the TARGET drive power can be determined by means of the speed control system. Thus, the TARGET drive power can be reliably determined using simple means.

In accordance with a preferred embodiment of the method according to the invention, it can be provided for the drive power tolerance value to be prescribed as a function of the ACTUAL speed. This means that a first drive power tolerance value can be prescribed for a first ACTUAL speed and a second drive power tolerance value can be prescribed for a second ACTUAL speed, whereby the second drive power tolerance value differs from the first drive power tolerance value. Therefore, the drive power tolerance value can be varied as a function of the ACTUAL speed. This has the advantage, for example, that the warning message can be better adapted to an anticipated response time of the driver and/or to a different response of the drive train at different ACTUAL speeds.

Here, it is preferred for a first drive power tolerance value to be prescribed for a first ACTUAL speed and for a second drive power tolerance value to be prescribed for a second ACTUAL speed, whereby the first ACTUAL speed is greater than the second ACTUAL speed, and the first drive power tolerance value is greater than the second drive power tolerance value. In other words, the drive power tolerance value increases as the ACTUAL speed increases. This has the advantage that it takes into account the non-linear relationship between the ACTUAL speed and the required drive power of the motor vehicle in order to maintain the appertaining ACTUAL speed at constant boundary conditions such as, for instance, the incline, the wind velocity and the like. This non-linear relationship is especially based on the influence of the air resistance that increases over-proportionally as the ACTUAL speed increases.

According to the invention, it is preferred for the warning message to be issued as an optical warning signal and/or as a haptic warning signal on the steering wheel of the motor vehicle and/or as a haptic warning signal on the gas pedal of the motor vehicle and/or as an acoustic warning signal. The acoustic warning signal can be issued, for example, via a loudspeaker of the motor vehicle, especially of an entertainment system, or via a piezo signal transmitter of the motor vehicle. When the warning signal is issued, it can be provided according to the invention that several warning messages are issued simultaneously, either overlapping each other or independently of each other in terms of time. Preferably, for example, an optical warning signal such as, for instance, an LED signal, is issued at an early point in time in case of a very large difference between the switchover power and the TARGET drive power, in other words, in the case of a relatively high drive power tolerance value, while a haptic signal on the gas pedal is issued at a later point in time in case of a smaller difference, that is to say, a relatively low drive power tolerance value. In this manner, the driver of the motor vehicle is incrementally made aware that the TARGET drive power is approaching the switchover power. Such warning messages have the advantage that they are particularly suitable to make the driver aware of the advancing approach of the TARGET drive power to the switchover power, without in this process excessively distracting the driver from driving the motor vehicle. Moreover, this promotes an early response by the driver in order to avoid the switchover to the serial mode of operation or in order to approach the switchover power.

Preferably, the warning message is issued in the form of a resistance against further actuation of the gas pedal of the motor vehicle and/or in the form of a vibration of the gas pedal. Such a resistance can be configured, for example, in such a way that any further actuation of the gas pedal is blocked or at least temporarily blocked, or else at least made more difficult or temporarily made more difficult. In this manner, the driver receives feedback that, if he or she continues to actuate the gas pedal, a switchover to the serial mode of operation is about to occur or is occurring. Thus, the driver is given the possibility to counter such a switchover. The warning message is preferably configured in such a way that the driver is informed of such a successful countermeasure, for example, through the modulation or discontinuation of the warning message. This resistance is preferably configured along the lines of a resistance of a kickdown function of a motor vehicle. Preferably, the motor vehicle also has such a kickdown function. The warning message is preferably issued once again when the difference drops again and when the value falls below the drive power tolerance value or once again falls below the drive power tolerance value.

Such haptic warning messages have the advantage that they can be very readily perceived by the driver and they promote a fast response on the part of the driver since they act upon the driver's foot so that they can trigger a reflex-like response to reduce the TARGET drive power.

According to a second aspect of the invention, the objective is achieved by a motor vehicle having a hybrid drive train and a control device for controlling the hybrid drive train. The hybrid drive train has an internal combustion engine, a first electric machine and a second electric machine, whereby the first electric machine is mechanically coupled to the internal combustion engine, whereby the internal combustion engine is mechanically coupled via a separating clutch of the hybrid drive train to a first gear of the hybrid drive train. The first gear is mechanically coupled to at least one wheel of the motor vehicle. The second electric machine is mechanically coupled to at least one wheel of the motor vehicle. According to the invention, the control device comprises a computing unit and a storage unit, whereby a program is stored in the storage unit, and, when the program is at least partially executed in the computing unit, it carries out a method according to the invention. According to the invention, the motor vehicle can also have additional electric machines that are configured to propel the motor vehicle.

When it comes to the motor vehicle according to the invention, the same advantages arise as those already described above regarding the method according to the invention for operating a hybrid drive train of a motor vehicle. Accordingly, the motor vehicle entails the advantage that, with simple means and in a cost-effective manner, a driver of the motor vehicle can be informed of an impending change to the serial mode of operation of the hybrid drive train, so that the driver is given the option to avoid or at least delay such a change by actively reducing the TARGET drive power. In this manner, the driver of the motor vehicle can prevent or at least reduce "howling" of the internal combustion engine and/or a change to the serial mode which might be less favorable in terms of energy.

It is preferable for the first gear to be configured as a single-stage gear, whereby the gear ratio of the first gear is between 2.4 and 3.0. Therefore, the single-stage gear has a gear ratio that corresponds approximately to that of the fifth gear of a five, six or seven-stage manual transmission of a motor vehicle. Such a gear has the advantage that it is substantially lighter and less complex than a multi-stage manual transmission. Owing to the gear ratio, the supply of the torque by the internal combustion engine above about 55 km/h is particularly advantageous from a technical as well as from a cost viewpoint. In this manner, it is possible to reduce the costs for the production of the motor vehicle according to the invention as well as the operating costs.

In accordance with a preferred embodiment of the motor vehicle according to the invention, it can be provided that the motor vehicle has a gas pedal, whereby the gas pedal is configured to issue an optical warning signal. Such an optical warning signal can be a vibration or a resistance or a temporary blocking. In this context, it can be provided that the gas pedal is configured in such a way that increasing the pressure on the gas pedal overcomes this resistance or blocking. Such a gas pedal has the advantage that the warning signal can be perceived very quickly by the driver, thereby permitting a response by the driver to the warning signal, especially a reflex-like response to the warning signal without any noticeable delay. Consequently, the driver of the motor vehicle is given, for example, the improved possibility to reduce the TARGET drive power in such a way that a switchover to the serial mode of operation of the motor vehicle is avoided or at least temporarily avoided.

BRIEF DESCRIPTION OF THE INVENTION

A method according to the invention for operating a hybrid drive train of a motor vehicle as well as a motor vehicle according to the invention are explained below in greater detail with reference to drawings. The following is schematically shown.

DETAILED DESCRIPTION OF THE INVENTION

Elements having the same function and mode of operation are designated with the same reference numerals in FIGS. 1 through 4.

Figure 1:
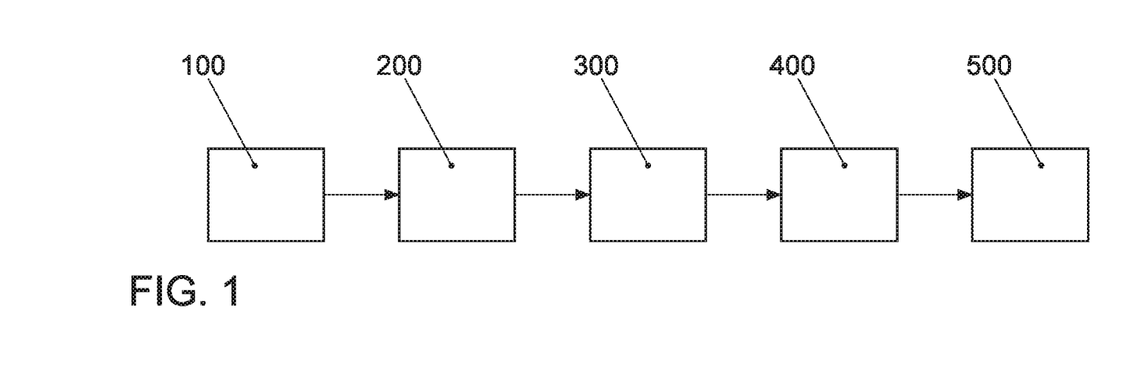
FIG. 1 a flow chart of a preferred embodiment of the method according to the invention, FIG. 2 a top view of a hybrid drive train, FIG. 3 a diagram showing different modes of operation as a function of the ACTUAL vehicle speed and the TARGET drive power of a motor vehicle, and FIG. 4 a side view of a preferred embodiment of a motor vehicle according to the invention.

FIG. 1 is a flow chart showing a preferred embodiment of a method according to the invention. In a first method step 100, a separating clutch 6 (see FIG. 2) of a motor vehicle 2 (see FIG. 4) is closed, so that an internal combustion engine 3 (see FIG. 2) is mechanically coupled to at least one wheel 8 (see FIG. 2). In this state, the motor vehicle 2 is being powered, whereby the drive power is supplied at least partially by the internal combustion engine 3. In a second method step 200, a TARGET drive power P of the drive train 1 (see FIG. 2) of the motor vehicle 2 is determined, for example, by detecting a position of the gas pedal 9 (see FIG. 4) of the motor vehicle 2. In a third method step 300, an ACTUAL speed V (see FIG. 3) of the motor vehicle 2 is determined. In a fourth method step 400, a switchover power U (see FIG. 3) is determined in order to separate the separating clutch 6 and in order to operate the drive train 1 in the serial mode of operation SB as a function of the determined ACTUAL speed V. In the serial mode of operation SB, the drive power to power the motor vehicle 2 is supplied by the second electric machine 5. The electric energy for operating the second electric machine 5 is generated at least partially by a first electric machine 4 (see FIG. 2), whereby the first electric machine 4 is powered by the internal combustion engine 3 in order to generate the electric energy. In a fifth method step 500, a warning message is issued if the difference between the switchover power U and the TARGET drive power P falls below a prescribed drive power tolerance value T (see FIG. 3). The drive power tolerance value T is preferably between 1% and 15%, especially between 5% and 10%, of the switchover power U. Especially preferably, the drive power tolerance value T is about 8% of the switchover power U.

Figure 2:
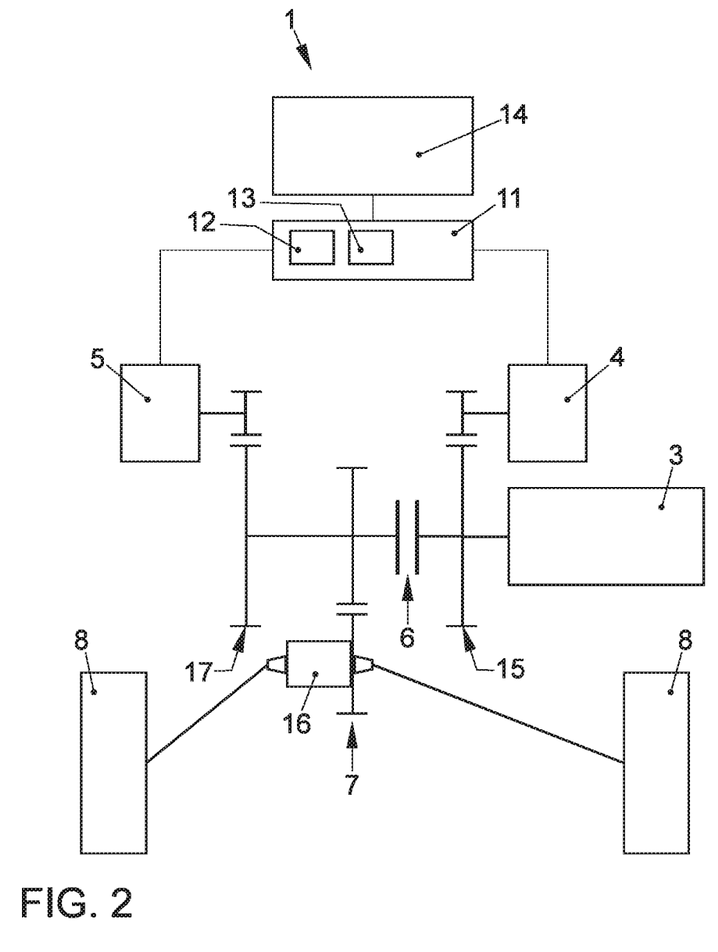

FIG. 2 schematically shows a top view of a preferred embodiment of a hybrid drive train 1. The hybrid drive train 1 has an internal combustion engine 3 and a first electric machine 4 that are mechanically coupled to each other by means of a second gear 15. The second gear 15 is preferably configured as a single-stage gear. A single-stage gear is a gear that has one gear stage and thus a constant gear ratio. Moreover, the internal combustion engine 3 can be mechanically coupled to a first gear 7 via a separating clutch 6, whereby the first gear 7 is mechanically coupled to the wheels 8. The first gear 7 is preferably configured as a single-stage gear. In this embodiment, the first gear 7 is mechanically coupled to the wheels 8 via a differential gear 16. A second electric machine 5 is mechanically coupled to the first gear 7 via a third gear 17 that is preferably configured as a single-stage gear and is thus mechanically coupled to the wheels 8. Alternatively, the second electric machine 5 can also be mechanically coupled to the wheels 8 directly via the third gear 17 or via the differential gear 16. The first electric machine 4 is electrically coupled to a battery 14 as well as to the second electric machine 5 by means of a control device 11 that has power electronics for converting electric voltage. The power electronics are preferably configured as double power electronics. Consequently, electric current generated by the first electric machine 4 can be used to charge the battery 14. Moreover, in this manner, electric current generated by the first electric machine 4 can be transmitted to the second electric machine 5 by means of the control device 11, so as to thus operate the second electric machine 5. The control device 11 has a computing unit 12 as well as a storage unit 13. In the parallel mode of operation PB, the separating clutch 6 is closed, so that the drive power can be supplied in parallel by the internal combustion engine 3 and/or by the second electric machine 5. In the serial mode of operation SB (see FIG. 3), the separating clutch 6 is open, so that the drive power is supplied exclusively by the second electric machine 5 and the electric energy needed for this purpose is generated at least partially by the first electric machine 4.

Figure 3:
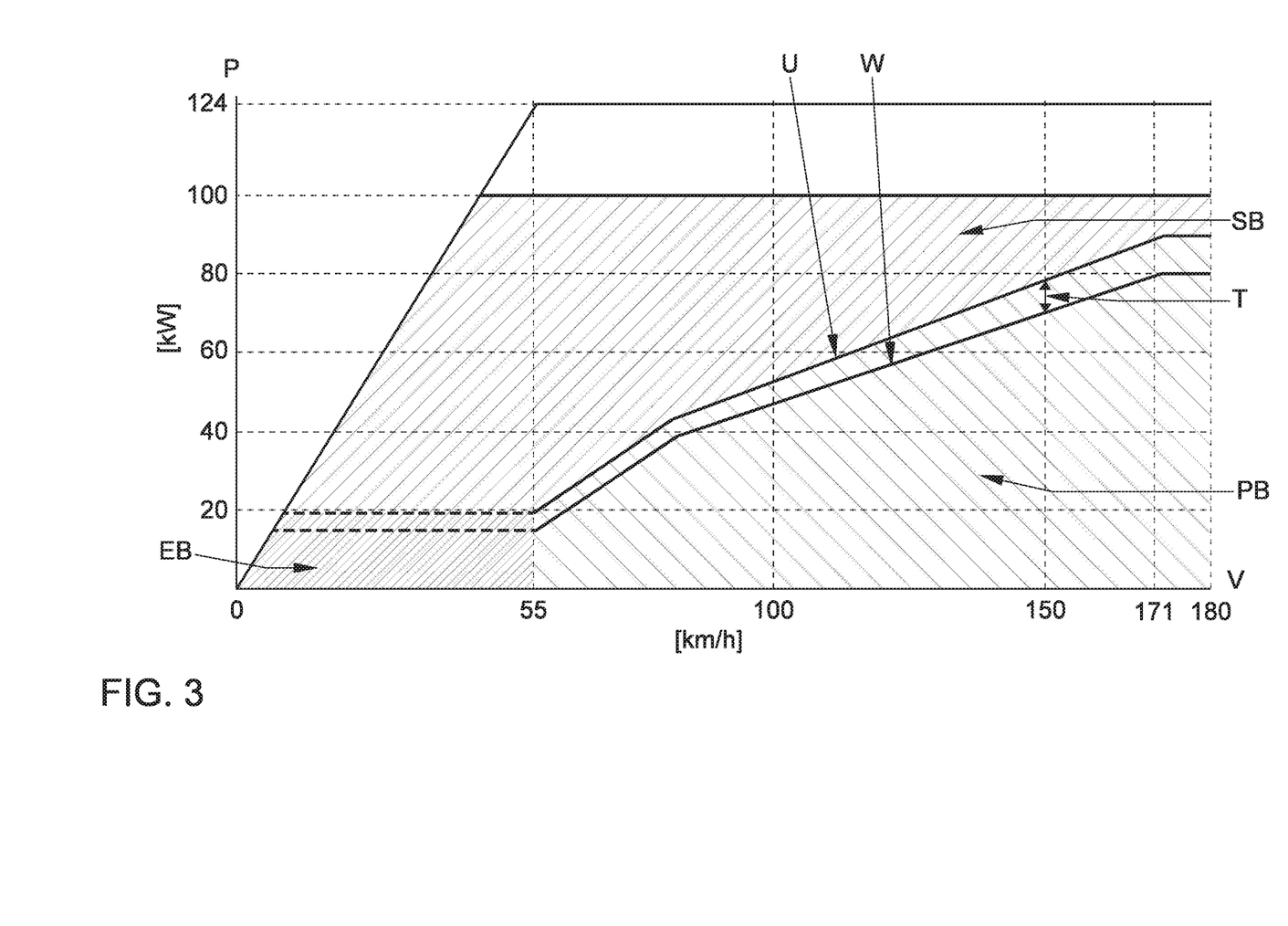

FIG. 3 is a diagram showing various modes of operation of a hybrid drive train 1 as a function of an ACTUAL speed V and a TARGET drive power P. At speeds below 55 km/h, additionally coupling in the internal combustion engine 3 is not desired, so that, at a TARGET drive power P, for example, below 20 kW, purely electric driving is possible in the electric mode of operation EB. In the electric mode of operation EB, the drive power is supplied exclusively by the second electric machine 5 which acquires the electric energy needed for this purpose from the battery 14. At TARGET drive powers P above, for example, 20 kW, there is a need for the additional generation of electric energy by means of the first electric machine 4. In this range, the motor vehicle is in the serial mode of operation SB. When it comes to the method according to the invention, vehicle speeds above 55 km/h are of particular interest. As can be seen in the diagram, the switchover power U increases steadily as the ACTUAL speed V increases. Therefore, for each ACTUAL speed V, a switchover power U can be determined above which the serial mode of operation SB and below which the parallel mode of operation PB of the hybrid drive train 1 are activated. Below the switchover power U, there is a warning curve W that, for each ACTUAL speed V, is at a distance from the switchover power U by a speed-dependent drive power tolerance value T. As can be seen in this diagram, the drive power tolerance value T increases as the ACTUAL speed V increases. At an ACTUAL speed V of, for instance, 150 km/h and a momentary TARGET drive power P of, for example, 60 kW, the motor vehicle 2 is operated in the parallel mode of operation PB. If the TARGET drive power P now rises, especially if it rises abruptly, the warning curve W is reached at about 70 kW, so that the difference between the switchover power U and the TARGET drive power P corresponds to the drive power tolerance value T and, according to the invention, a warning signal is issued. The driver of the motor vehicle 2 can now decide whether he or she wishes to further increase the TARGET drive power P, which might exceed the switchover power U, thus bringing about a switchover to the serial mode of operation SB, or else to increase the TARGET drive power P that is controlled in such a way that the TARGET drive power P does not exceed the switchover power U, and a further operation of the hybrid drive train 1 is possible in the parallel mode of operation PB. As this graph likewise shows, as the ACTUAL speed V increases up to an ACTUAL speed V of, for instance, 171 km/h, the TARGET drive power P can be continuously increased without this bringing about a change from the parallel mode of operation PB to the serial mode of operation SB. In contrast, above an ACTUAL speed V of more than, for example, 171 km/h, the switchover power U runs parallel to the abscissa, so that, above this ACTUAL speed V, a maximum possible TARGET drive power P for remaining in the parallel mode of operation PB is constant.

Figure 4:
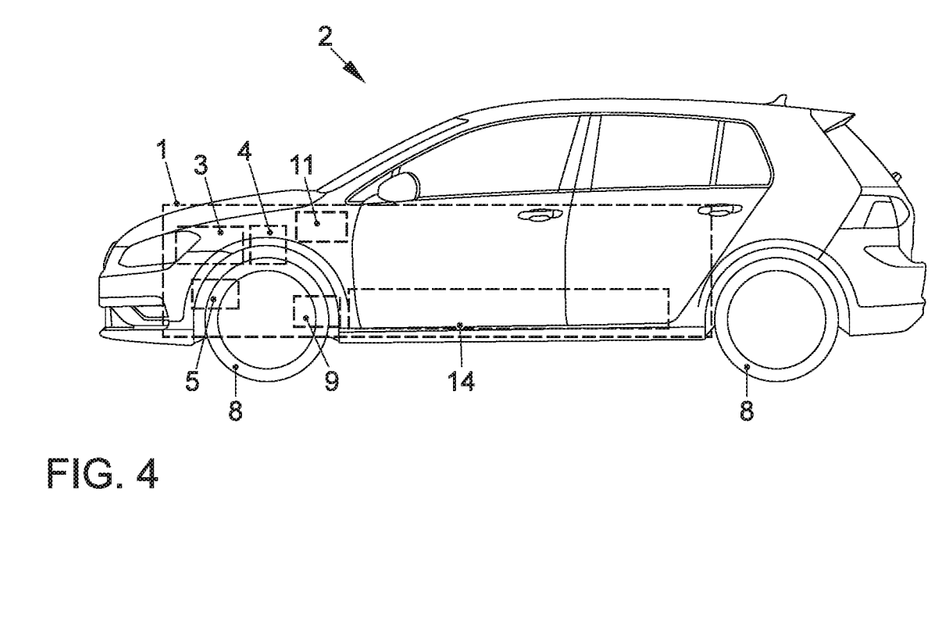

FIG. 4 schematically shows a side view of a motor vehicle 2 according to the invention. Components of the motor vehicle 2 that are not visible from the outside are indicated by broken-line rectangles. The hybrid drive train 1 has an internal combustion engine 3, a first electric machine 4 and a second electric machine 5, which are coupled or can be coupled mechanically via a gear (not shown here) to a front wheel 8 of the motor vehicle 2. Preferably, the hybrid drive train 1 of the motor vehicle 2 is configured according to the hybrid drive train 1 shown in FIG. 2. Accordingly, the hybrid drive train 1 has a control device 11 for controlling the hybrid drive train 1 as well as a battery 14 for storing and providing electric energy. The motor vehicle 2 has a gas pedal 9 by means of which the driver of the motor vehicle 2 can prescribe a TARGET drive power P.

LIST OF REFERENCE NUMERALS

1 hybrid drive train
2 motor vehicle
3 internal combustion engine
4 first electric machine
5 second electric machine
6 separating clutch
7 first gear
8 wheel
9 gas pedal
10 steering wheel
11 control device
12 computing unit
13 storage unit
14 battery
15 second gear
16 differential gear
17 third gear
100 first method step
200 second method step
300 third method step
400 fourth method step
500 fifth method step
EB electric mode of operation
P TARGET drive power
PB parallel mode of operation
SB serial mode of operation
T drive power tolerance value
U switchover power
V ACTUAL speed
W warning curve

The invention claimed is:

1. A method for operating a hybrid drive train of a motor vehicle, whereby the hybrid drive train comprises an internal combustion engine, a first electric machine and a second electric machine, whereby the first electric machine is mechanically coupled to the internal combustion engine, whereby the internal combustion engine is mechanically coupled to a first gear of the hybrid drive train via a separating clutch of the hybrid drive train, whereby the first gear is mechanically coupled to at least one wheel of the motor vehicle, and whereby the second electric machine is mechanically coupled to at least one wheel of the motor vehicle, said method comprising the following steps:

closing the separating clutch to mechanically couple the internal combustion engine to the at least one wheel and to propel the motor vehicle,     supplying a first drive power at least partially by the internal combustion engine,     determining a target drive power of the drive train of the motor vehicle,     determining a first actual speed of the motor vehicle (2),     determining a switchover power to separate the separating clutch and to operate the drive train in a serial mode of operation as a function of the first actual speed,     supplying a second drive power in the serial mode of operation by the second electric machine,     generating electric energy for operating the second electric machine at least partially by the first electric machine,     powering the first electric machine by the internal combustion engine in order to generate the electric energy, and     issuing a warning message when a difference between the switchover power and the target drive power falls below a first drive power tolerance value.

2. The method according to claim 1, further comprising operating the motor vehicle in a parallel mode of operation or in an electric mode of operation whenever the first drive power tolerance value is exceeded, whereby in the parallel mode of operation, the drive power is supplied by the internal combustion engine and by the second electric machine, and whereby in the electric mode of operation, the drive power is supplied by the second electric machine.

3. The method according to claim 1, further comprising determining the target drive power on the basis of a position of a gas pedal of the motor vehicle and/or by a speed control system of the motor vehicle.

4. The method according to claim 1, further comprising prescribing the first drive power tolerance value as a function of the first actual speed.

5. The method according to claim 4, further comprising prescribing a second drive power tolerance value for a second actual speed, whereby the first actual speed is greater than the second actual speed, and the first drive power tolerance value is greater than the second drive power tolerance value.

6. The method according to claim 1, wherein issuing the warning message comprises issuing:

an optical warning signal, a haptic warning signal on a steering wheel of the motor vehicle,     a haptic warning signal on a gas pedal of the motor vehicle, and/or     acoustic warning signal.

7. The method according to claim 1, wherein issuing the warning message comprises creating a resistance against further actuation of a gas pedal of the motor vehicle and/or a vibration of the gas pedal.

8. A motor vehicle comprising:

a hybrid drive train having:

a first gear mechanically coupled to at least one wheel of the motor vehicle,         an internal combustion engine coupled via a separating clutch of the hybrid drive train to the first gear of the hybrid drive train,         a first electric machine mechanically coupled to the internal combustion engine, and         a second electric machine mechanically coupled to the at least one wheel of the motor vehicle; and     a control device for controlling the hybrid drive train, wherein the control device comprises:

a computing unit, a storage unit, and a program stored in the storage unit,         wherein, when the program is at least partially executed in the computing unit, the control device is configured to:

close the separating clutch to mechanically couple the internal combustion engine to the at least one wheel and to propel the motor vehicle,             supply a first drive power at least partially by the internal combustion engine,             determine a target drive power of the drive train of the motor vehicle,             determine a first actual speed of the motor vehicle,             determine a switchover power to separate the separating clutch and to operate the drive train in a serial mode of operation as a function of the first actual speed,             supply a second drive power in the serial mode of operation by the second electric machine,             generate electrical energy for operating the second electric machine at last partially by the first electric machine,             power the first electric machine by the internal combustion engine in order to generate the electric energy, and             issue a warning message when a difference between the switchover power and the target drive power falls below a first drive power tolerance value.

9. The motor vehicle according to claim 8, wherein the first gear is configured as a single-stage gear, whereby a gear ratio of the first gear is between 2.4 and 3.0.

10. The motor vehicle according to claim 8, further comprising a gas pedal configured to issue a haptic warning signal.

11. The motor vehicle according to claim 8, wherein the control device is further configured to operate the motor vehicle in a parallel mode of operation or in an electric mode of operation whenever the first drive power tolerance value is exceeded, whereby in the parallel mode of operation, the drive power is supplied by the internal combustion engine and by the second electric machine, and whereby in the electric mode of operation, the drive power is supplied by the second electric machine.

12. The motor vehicle according to claim 8, wherein the control device is further configured to determine the target drive power on the basis of a position of a gas pedal of the motor vehicle and/or by a speed control system of the motor vehicle.

13. The motor vehicle according to claim 8, wherein the first drive power tolerance value is a function of the first actual speed.

14. The motor vehicle according to claim 13, wherein a second drive power tolerance value is prescribed for a second actual speed, wherein the first actual speed is greater than the second actual speed, and the first drive power tolerance value is greater than the second drive power tolerance value.

15. The motor vehicle according to claim 8, wherein the warning message comprises:
   an optical warning signal,
   a haptic warning signal on a steering wheel of the motor vehicle,
   a haptic warning signal on a gas pedal of the motor vehicle, and/or
   an acoustic warning signal.

16. The motor vehicle according to claim 8, wherein the warning message comprises a resistance against further actuation of a gas pedal of the motor vehicle and/or a vibration of the gas pedal.

* * * * *